(12) United States Patent
Nisbet et al.

(10) Patent No.: US 7,012,934 B1
(45) Date of Patent: Mar. 14, 2006

(54) METHOD AND APPARATUS FOR DETECTING A NETWORK TIMING LOOP

(75) Inventors: Alan D Nisbet, Ottawa (CA); Brent A Hart, Ball Ground, GA (US)

(73) Assignee: Nortel Networks Limited, St. Laurent (CA)

( * ) Notice: Subject to any disclaimer, the term of this patent is extended or adjusted under 35 U.S.C. 154(b) by 910 days.

(21) Appl. No.: 09/984,858

(22) Filed: Oct. 31, 2001

(51) Int. Cl.
 *H04J 3/06* (2006.01)
(52) U.S. Cl. ..................................... 370/503
(58) Field of Classification Search ............... 370/503, 370/509, 510, 511, 512
 See application file for complete search history.

(56) References Cited

U.S. PATENT DOCUMENTS

| | | | | |
|---|---|---|---|---|
| 6,163,551 A * | 12/2000 | Wolf | ........................... | 370/503 |
| 6,317,475 B1 * | 11/2001 | Kasurinen | ................... | 375/356 |
| 6,411,633 B1 * | 6/2002 | Wolf | ........................... | 370/503 |
| 6,567,422 B1 * | 5/2003 | Takeguchi et al. | .......... | 370/503 |
| 6,707,828 B1 * | 3/2004 | Wolf | ........................... | 370/503 |
| 6,738,579 B1 * | 5/2004 | Wolf | ........................... | 398/50 |
| 6,741,812 B1 * | 5/2004 | Wolf | ........................... | 398/79 |
| 6,895,189 B1 * | 5/2005 | Bedrosian | ................... | 398/155 |

* cited by examiner

*Primary Examiner*—Chi Pham
*Assistant Examiner*—Blanche Wong
(74) *Attorney, Agent, or Firm*—Borden Ladner Gervais LLP; Dennis R. Haszko

(57) ABSTRACT

The present invention provides a method, system, data structure and article of manufacture for detecting the potential of a timing loop occurrence within an optical network having a plurality of network elements. The method includes the steps of: building a data block for each of the network elements, each such data block including information regarding the status of synchronization status messaging (SSM) in the network; and evaluating timing distribution engineering of the network based on information in the data blocks, so as to determine the potential of timing loop occurrence in the network. The present invention provides the ability to detect the potential of a timing loop occurrence (in networks not employing SSM as well as networks employing SSM) as a result of network elements receiving line timing from one another, as opposed to having to wait for a network timing loop to occur and having to deal reactively with the problem.

21 Claims, 7 Drawing Sheets

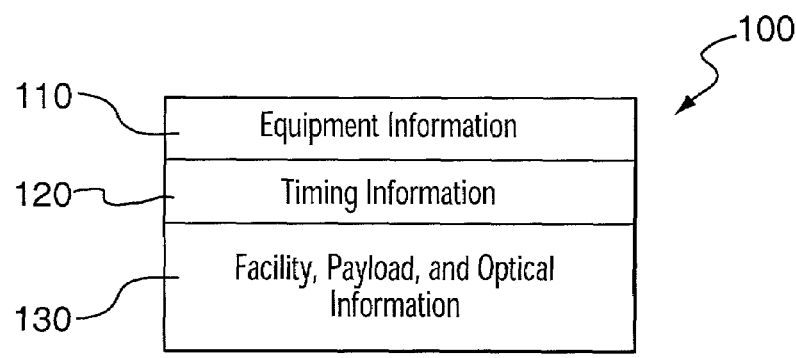
FIG. 1
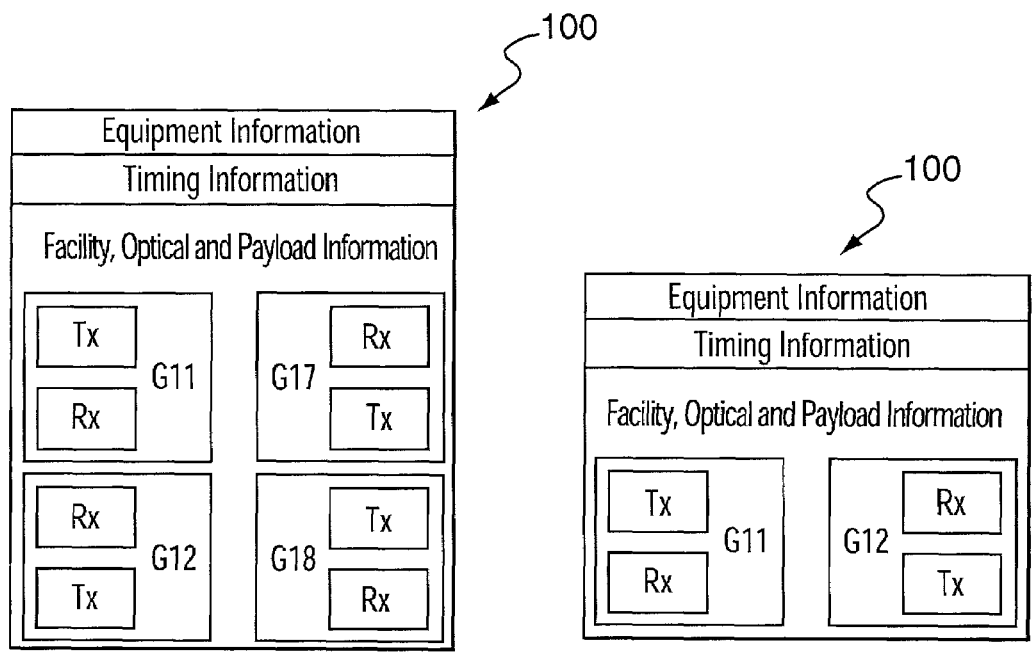
FIG. 2A
FIG. 2B

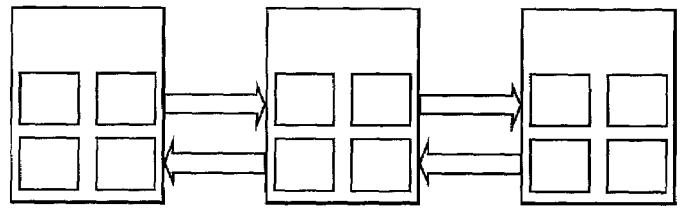

FIG. 3

```
NE 2208> eq ne qrne
NE Equipment              NE Id: 2208
NE Type:       4FR
NE Name:          NE1locationNAME
Location:
Function:      SONET
Line Rate:     OC192

Date:          13/07/00 [DD/MM/YY]
Time:          18/50/22 [HH/MM/SS]
Time Zone:     GMT Shelf         Vintage    Position      Serial Number
---------------------------------------------------------
Control          0          1          NTM013313DD0
DX_MAIN          0          2
DX_EXTENSION     0          3
```

FIG. 4

```
NE 2208> pr tg grpg
Protection Scheme:     2:1
Revertive Mode:        Non-revertive
Wait To Restore:       -seconds
QC Threshold:          SMC Ref# Source  PState  Status    QCode  Forced  AutoSw  Manual  Priority
-----------------------------------------------------------------------
1    BITS A   IS     Active    STU      .       .       .        1
2    BITS B   IS     Standby   STU      .       .       .        1
3    NULL     -      -         -        .       .       .        -
4    NULL     -      -         -        .       .       .        -
5    NULL     -      -         -        .       .       .        -
6    NULL     -      -         -        .       .       .        -
```

FIG. 5

```
NE 2208> eq cpge sel oc192 g11 qr                    601
Equipment Type:    OC192           CPG Name:       G11
Primary State:     IS              Secondary State: TxActive RxActive
                    Provisioned    Capable
Tx Optical Power(dBm): -10.00      -10.00, ..., 1.50
Tx Chirp:              Negative    Negative, Positive
Tx Wavelength(nm):     1555.75     1555.75
Tx NLS Dither:         Off         Off,On
Tx analog Maintainance: AM2        AM1,AM2
```

```
NE 2208> ofa rof sel oc192 g11 qr

Unit: OC192 G11                701
NE Id: 2208
Physical PM values:
                    Current      Last (Asolute Base)   Normalized(%)
Rx Power (OPR):     -40.00 ? dBm    -14.17 ? dBm           0.00
       IQ :           0.00 ? volts    0.58 ? volts         0.00
                                       Last Saved: 15:56 12/07/00
Press CR to return to menu
                                702
```

Unit: OC192 G11                      Direction: RX
NE ID: 2208                          Location: NEND 15-minute              1-day
        801   current    last     current      last
Sect CV         0         0          0          0?
Sect ES        353       900       67853      28493 ?
Sect Ses       353       900       67853      28493 ?
Sect SEFS      353       900       67853      28493 ?
Line CV         0         0          0          0 ?
Line ES   802   0         0          0          0 ?
Line SES        0         0          0          0 ?
Line UAS       353       900       67853      28493 ?
LINE FC         0         0          0          1 ?
Line FEC        0         0          0          0 ?
Press CR to return to menu
```

FIG. 8

```
NE 2208> fa ocf qr oc192 g12
OCn Facility                        Shelf:      2
                                    Unit:       OC192 G12
                                    Direction:  Bi
Primary State: IS                   Secondary State: FAF
CLFI:
FEC:            On Section Trace Enabled/Disabled:     Enabled
Section Trace Format:               1 Byte 16 Byte TX Section Trace:
16 Byte RX Section Trace:
16 Byte Actual RX Section Trace:
Suspect Status:                     Unreliable 1 Byte TX Section Trace:            0
1 Byte RX Section Trace:            0
1 Byte Actual RX Section Trace:     0
Suspect Status:                     Reliable Signal Degrade Threshold:           1:0E-8
Signal Fail Threshold:              1:0E-4

TX SSM Raw Quality Code:            STU
TX SSM Quality Code Override:       AUTO              —901
TX SSM Global Mode:                 FALSE RX SSM Raw Quality Code:            STU
RX SSM Quality Code Override:       AUTO
RX SSM Global Mode:                 FALSE
```

FIG. 9

| Type: 4FR | NE ID: NE1 |
|---|---|
| Name: NE1locationNAME | |

| RX SSM Quality Code Overide: AUTO | | | |
|---|---|---|---|
| Ref# Source | PState | Status | QCode |
| 1 BITS A | IS | Active | STU |
| 2 BITS B | IS | Standby | STU |
| 3 OC192 G11 | IS | Standby | STU |
| 4 OC192 G12 | IS | Standby | STU |
| 5 OC192 G17 | IS | Standby | STU |
| 6 OC192 G18 | IS | Standby | STU |

| | |
|---|---|
| G11 Tx 1555.75<br>Chirp: Positive<br>Tx Output Power: -7.50<br>Section ES: 0<br>Line ES:0 | G17 Rx<br>RXIQ: 0.48<br>Rx Input Power: -6.23<br>Section ES: 0<br>Line ES: 0 |
| G11 Rx<br>RXIQ: 0.48<br>Rx Input Power: -6.23<br>Section ES: 0<br>Line ES:0 | G17 Tx 1533.47<br>Chirp: Positive<br>Tx Output Power: -7.50<br>Section ES: 0<br>Line ES: 0 |
| G12 Rx<br>RXIQ: 0.48<br>Rx Input Power: -6.23<br>Section ES: 0<br>Line ES: 0 | G18 Tx 1533.47<br>Chirp: Positive<br>Tx Output Power: -7.50<br>Section ES: 0<br>Line ES: 0 |
| G12 Tx 1533.47<br>Chirp: Positive<br>Tx Output Power: -7.50<br>Section ES: 0<br>Line ES: 0 | G18 Rx<br>RXIQ: 0.48<br>Rx Input Power: -6.23<br>Section ES: 0<br>Line ES: 0 |

FIG. 10

METHOD AND APPARATUS FOR DETECTING A NETWORK TIMING LOOP

FIELD OF INVENTION

The present invention relates to the field of communication networks and to the identification of timing loops within such networks.

BACKGROUND OF THE INVENTION

A major concern in timing distribution engineering for network planning, reconfiguration, and maintenance, is the avoidance of timing loops. Timing loops occur when slave-clocks form a loop, so that the active reference input of any of the clocks is actually locked indirectly to the output of that same clock. The occurrence of timing loops is usually due to human error during the network design process, during equipment commissioning/provisioning, or during the reconfiguration of the system.

The presence of timing loops in networks has led to the deployment and provisioning of network elements that inadvertently feed themselves timing information, resulting in the timing performance within the network degrading with time and becoming unpredictable. This timing deviation, or phase, can maintain close alignment with the primary or designated timing source for quite a number of hours. This may result in the occurrence of an arbitrary frequency offset at an unpredictable time at a rate that would occur much faster if the network element (NE) were to go into "holdover" mode.

Previous methods and systems that addressed the potential risk of timing loops occurring within deployed networks have mostly been reactive in nature. As a result, when a timing loop does occur, it requires troubleshooting. This troubleshooting may involve examining engineering diagrams, if available, logging in to each network element to read the alarms, and determining the timing relationship between each network element and throughout the network. Depending on the size of the network, this process can take many hours to complete. More critically, each network element, when examined, may appear to be in an apparently normal mode of operation, so that there are no alarms raised to alert monitoring systems, or field technicians, of a timing loop occurring. So, given the distributed nature of timing degradation caused and the lack of alarms raised, the diagnosis of a timing loop from a reactive mode is extremely difficult to accomplish.

Synchronization Status Messaging (SSM) is a communications protocol used in Synchronous Optical Networks (SONET). SSM assures a network operator that all network elements are operating at a common frequency within the boundaries set by standards. As such, SSM ensures the quality of the timing references throughout the network.

In some known implementations, SSM provides timing references based on the quality of available timing sources. These timing sources include external timing from building integrated timing supplies (BITS), line timing derived from high-speed (OC-192) lines, and the internal clock in the network elements.

The S1 byte information in SSM is referred to as a quality code. Each NE can detect the quality codes that describe the incoming timing signals. Then, the timing reference protection software on the ESIs (External Synchronous Interfaces) uses the quality code information to make decisions about which timing source to select as a timing reference. Protection switches can occur as a result of a change in the incoming quality code (QC) of an active timing reference. An invalid incoming QC will raise an alarm.

SSM has two goals: to ensure an NE uses the best available timing source; and to reduce the risk of timing loops occurring between two or more network elements. With the introduction of SSM into network elements, timing loop occurrences have been significantly reduced; however, SSM does not completely eliminate the occurrence of timing loops.

Moreover, SSM cannot be used by all customers. SSM requires BITS clock generation with an output capable of a DS1 reference signal using Extended Super Frame format. Older clock sources may only be capable of Super Frame format. Therefore it is possible that a customer may not be able to utilize SSM due to their BITS source clocks. A customer may interface SSM-compatible equipment with another vendor's product (or use a pseudo-BITS timing source in the equipment) that may not be SSM capable, thus rendering the equipment unable to utilize SSM. Also, customers running DX1 on DX bays along with OC192 bays loaded with DX1 in the same system cannot utilize SSM.

Therefore, there is a need to overcome at least one of the drawbacks of the prior art, which restrict the detection of timing loops to reactive methods that may only be applied to networks that do not utilize SSM.

SUMMARY OF INVENTION

The present invention affords the ability to detect the potential of a timing loop occurrence as a result of network elements receiving line timing from one another, as opposed to waiting for a network timing loop to occur and having to deal reactively with the problem.

The present invention may be used on network elements that are of the capacity of DX/OC192 product lines. However, the principles of the present invention may also be applicable for use with low speed transport platforms such as OC3, OC12, and OC48, with the necessary modifications due to differences in provisioning being apparent to one skilled in the art.

According to an aspect of the invention, there is provided a method of detecting the potential of a timing loop occurrence within an optical network having a plurality of network elements comprising the steps of: checking a status of synchronization status messaging (SSM) for each of said network elements; and determining, on the basis of said SSM status check, that the timing distribution of said network is engineered to create a timing loop if timing provisioning rules are violated at any of said network elements.

According to another aspect of the invention, there is provided an apparatus for detecting the potential of a timing loop occurrence within an optical network having a plurality of network elements comprising: means for checking a status of synchronization status messaging (SSM) for each of said network elements; and means for determining that the timing distribution of said network is engineered to create a timing loop if timing provisioning rules are violated at any of said network elements.

According to a further aspect of the invention, there is provided a method of detecting the potential of a timing loop occurrence within an optical network having a plurality of network elements comprising the steps of: building a data block for each of said network elements, each said data block including information regarding the status of synchronization status messaging (SSM) in said network; and determining the potential of a timing loop occurrence in the network based on some of said information in said data blocks.

According to a yet further aspect of the present invention, there is provided an apparatus for detecting the potential of a timing loop occurrence within an optical network having a plurality of network elements comprising: means for building a data block for each of said network elements, each said data block including information regarding the status of synchronization status messaging (SSM) in said network; and means for evaluating timing distribution engineering of said network based on information in said data blocks, so as to determine the potential of timing loop occurrence in the network.

According to a still further aspect of the present invention, there is provided a data structure stored in memory for use by a computer program in association with an optical network, the data structure comprising: first objects representing equipment information associated with a network element of said optical network; second objects representing timing information associated with said network element; and third objects representing facility, payload and optical information associated with said network element.

The present invention advantageously provides a proactive manner in which to identify whether the possibility exists for a timing loop to occur in a network due to the incorrect provisioning of the timing sources on network elements.

It is another advantage of the invention to be able to examine the timing distribution engineering of a network utilizing SSM to determine if the network risks the occurrence of a timing loop failure if SSM is disabled or provisioned incorrectly.

It is a further advantage of the invention to be able to gather data from each of the network elements within the network and format the data into a representation that permits timing loops to be discovered.

It is another advantage of the invention to be able to gather data from each of the network elements within the network, use this data to determine the network's topology, and then extract data and format it into a representation that permits timing loops to be discovered.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will be further described with reference to the accompanying drawings in which:

FIG. 1 illustrates diagrammatically a data block constructed, according to an embodiment of the present invention, from information from a network element;

FIG. 2A illustrates an example of the construction of a data block of FIG. 1 for a 4-fiber network element used in either a chain or ring configuration;

FIG. 2B illustrates an example of the construction of a data block of FIG. 1 for a 2-fiber network element used in a ring configuration;

FIG. 3 illustrates a schematic showing the placement of a plurality of data blocks and the timing paths that are available for network elements within a portion of a 2-fiber bi-directional ring network topology;

FIG. 4 illustrates a screen shot showing equipment information that may be gathered from a network element by issuing a network command;

FIG. 5 illustrates a screen shot showing timing functionality information that may be gathered from a network element by issuing a network command;

FIG. 6 illustrates a screen shot showing facility information that may be gathered from a network element by issuing a network command;

FIG. 7 illustrates a screen shot showing optical information that may be gathered from a network element by issuing a network command;

FIG. 8 illustrates a screen shot showing payload information that may be gathered from a network element by issuing a network command;

FIG. 9 illustrates a screen shot showing information about the state of SSM in a network that is obtained by issuing a network command;

FIG. 10 illustrates an example of a data block with the relevant information collected from a network element having been formatted and inserted;

DETAILED DESCRIPTION OF THE INVENTION

Figure 11:
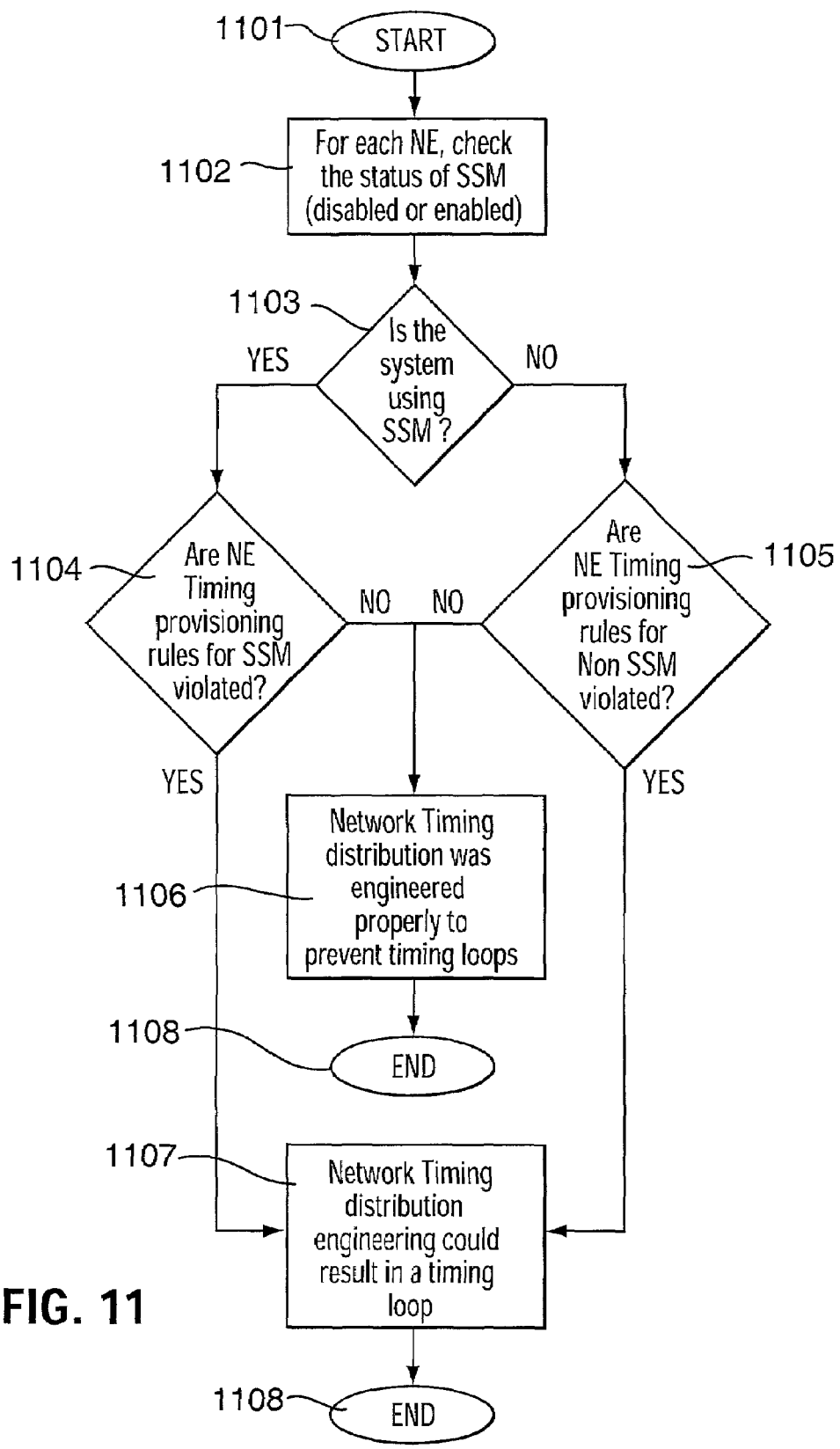
FIG. 11 illustrates a flowchart indicating steps in a method of detecting a network timing loop according to an embodiment of the present invention.

In order to determine whether a timing loop exists in a network according to a preferred embodiment of the present invention, the following steps are normally performed: identify the network element configuration; associate network elements into a network topology; section communications and network element association; build the network topology using nodal section information; build a data block for each network element; and evaluate the timing distribution engineering of the network. Timing distribution engineering describes the manner in which a network has been engineered with respect to timing distribution. In many cases, timing distribution engineering refers to timing provisioning rules which apply to a network.

An embodiment of the present invention will be described that automatically builds a network topology by identifying network configuration, associating the network elements into a network topology, sectioning communications and network element association, and building the network topology using the nodal section information.

However, it is equivalently possible to perform these network topology determinations by any other manner known in the art, including manually inputting the necessary data. If network topology were determined manually, the subsequent steps to be performed in accordance with the present invention would consist of: building a data block for each network element; and evaluating the timing distribution engineering of the network. Alternatively, the step of building a data block may be omitted, and a user may simply evaluate the timing distribution engineering of a network using a method of the invention.

The first task in the evaluation of a network's timing is to evaluate the configuration of each of its network elements. This may be accomplished by using various network element User Interface (NEUI) commands, such as eq ne qrne, to retrieve data from the network element. From the retrieved data, information is used to build up a data block that identifies the configuration of the network element. Building the network element's data block is examined in detail in a later section of this document.

However, although the type of network element may be identified correctly, the configuration of cards in a shelf may have some type of custom ordering. In order to confirm that the network element functions as it is identified, the cards listed in the shelf inventory will be used to confirm the network element's functionality. For example, if the network element is identified as a Regenerator, then the shelf inventory will be queried to determine if a circuit pack of type Rgn exists.

The next task consists of associating the network elements into a network topology. There are three principal types of topology that may be used to deploy a network. These topologies are named as: 4-fiber bi-directional line switched ring (4-Fiber BLSR); 4-fiber bi-directional ADM chain; and 2-fiber bi-directional line switched ring (2-Fiber BLSR). Each of these network topologies and the characteristics thereof are well known to those skilled in the art. Further discussion of the task of building a network topology in this manner can be found in U.S. patent application Ser. No. 09/740,934 of Nisbet et al. filed on Dec. 21, 2000, which is incorporated herein by reference.

Once the network elements, their orientation to one another within the network, and the network's topology have been determined, the next task is to gather and format the relevant communications, equipment, and timing data from each of the network elements. This data is then compiled into a structured block type format in order to build a data structure that is referred to as a data block.

To accomplish the building of the data block, the data is organized into three categories based on the functionality it represents within the network element. A high level grouping of the data block's information is illustrated in FIG. 1. The three categories of information are shown therein and their locations are also noted.

Within data block 100, the first category of data 110 contains information relating to the common equipment within the network element. The second category 120 contains information relating to the timing sources within the network element. The last category 130 contains information relating to the facility, payload, and optical parameters for each of the circuit pack groups and their transmitters and receivers.

The data block 100 may be further organized to show the transmitter and receiver orientations of the circuit pack groups in a network element. FIG. 2A illustrates an example of the construction of a data block for a 4-fiber network element used in either a chain or ring configuration. FIG. 2B illustrates an example of the construction of a data block for a 2-fiber network element used in a ring configuration.

When a plurality of data blocks 100 is arranged such that they are placed adjacent to one another, the relationships of the transmitters and receivers of the facilities of one network element with those of another network element are easily deduced. This arrangement permits for the verification of multiple timing paths to be identified and evaluated. FIG. 3 illustrates a schematic showing the placement of a plurality of data blocks and the timing paths that are available for network elements within a portion of a 2-fiber bi-directional ring network topology.

In an embodiment of the present invention, the information in category 110 of the data block relating to the equipment in the network element may be identified as follows:
ID Value
Configuration Type
Customer Assigned Name
Function and Line Rate This information may be gathered from the network element by issuing the NEUI command eq ne qrne, the result of which is shown in FIG. 4. Commands that may alternatively be used to obtain such equipment information include: eq ne rel, rib, and eq ne qri. In FIG. 4, the highlighted values indicate those values that are extracted for use, each being represented by reference numerals as follows: ID Value 401; Configuration Type 402; Customer Assigned Name 403; and Function and Line Rate 404.

In an embodiment of the present invention, the information in category 120 of the data block relating to the timing functionality of the network element may be identified as follows:
Quality Code (QC) Threshold
Source Reference Number (Ref#)
Source Name
Primary State (PState)
Status
Quality Code (Qcode)

This information may be gathered from the network element by issuing the NEUI command pr tg qrgp, the result of which command is shown in FIG. 5. In FIG. 5, the highlighted values indicate those values that are extracted for use, each being represented by reference numerals as follows: Quality Code (QC) Threshold 501; Source Reference Number (Ref#) 502; Source Name 503; Primary State (PState) 504; Status 505; and Quality Code (Qcode) 506.

In an embodiment of the present invention, the information in category 130 of the data block relating to each of the network element's facilities, payload and optical parameters may be identified as follows:
The identity of each of the high-speed circuit pack groups or facilities in the network element
Transmit Optical Power
Transmit Chirp
Transmit Wavelength
Transmit NLS Dither
Transmit Analog Maintenance
Receiver Power
Receiver IQ
Current Section Error Seconds (ES)
Current Line Error Seconds (ES)

The information elements relating to facility information may be gathered by issuing the NEUI command eq cpge se1 oc192 g11 qr, the result of which command is shown in FIG. 6. In FIG. 6, the highlighted values indicate those values that are extracted for use, each being represented by reference numerals as follows: the identity of each of the high-speed circuit pack groups or facilities in the network element 601; Transmit Optical Power 602; Transmit Chirp 603; Transmit Wavelength 604; Transmit NLS Dither 605; and Transmit Analog Maintenance 606.

The information elements relating to optical information may be gathered by issuing the NEUI command of a rof se1 oc192 g11 qr, the result of which command is shown in FIG. 7. In FIG. 7, the highlighted values indicate those values that are extracted for use, each being represented by reference numerals as follows: Receiver Power 701, and Receiver IQ 702.

Finally, the information elements relating to payload information may be gathered by issuing the NEUI command pm fp dc oc192 g11, the result of which command is shown in FIG. 8. In FIG. 8, the highlighted values indicate those values that are extracted for use, each being represented by reference numerals as follows: Current Section Error Seconds (ES) 801, and Current Line Error Seconds (ES) 802.

With respect to the facility, payload and optical information obtained by the commands listed above in association with the screenshots shown in FIGS. 6–8, the following commands may be alternately used to obtain such information: eq cpge qr, pm php dpm, and pin fp dc.

It is to be understood that the above examples illustrate specific information types that may be collected for each category with respect to a specific embodiment of the invention. Other embodiments are possible that may contain similar information types, or that may comprise more or less of such information types within each of the three categories.

Following the collection of equipment, timing, facility, payload and optical parameters, the state of synchronous status messaging in the network is determined. In order to determine the state of the SSM in the network, the NEUI command string fa ocf qr is issued, the result of which is illustrated in FIG. 9. The relevant data that is extracted from the network element is labeled as RX SSM Quality Code Override 901. This value is used at a later stage to determine if a network element is fully utilizing all of the SSM functionality.

Once all of this information has been gathered, it is possible to format the extracted data into a network element data block. FIG. 10 illustrates an example of a data block with the relevant information collected from the network element having been formatted and inserted. The example in FIG. 10 illustrates a data block for a network element that would be found in a 4-fiber ring or chain network topology.

Thus far, the work that has been performed has accomplished the following tasks: identify the type of network; organize the network elements into their deployed network topology; associate each of the network elements within the network to one another; extract synchronization information from each of the network elements within the network; extract provisioning information from each of the facilities for each of the network elements within the network; and format the extracted data into blocks for each of the network elements within the network.

However, in order to identify whether timing loops exist in the network, it remains to be determined if the network elements are capable of and fully utilizing SSM functionality; thereafter, the risk for potential timing loops may be determined.

FIG. 11 illustrates a flowchart indicating steps in a method for detecting a network timing loop according to an embodiment of the present invention. The first task is to determine the status or capability of each of the network elements with respect to the use of SSM. Step 1101 shows an example of this task, which begins by determining possible clock sources for each network element. In the case of a network having only one BITS clock, this step will involve identifying this one BITS clock as the primary clock source. Following that, it is determined, in step 1102, for each NE, whether SSM is being fully utilized or if the Network Elements have been provisioned to ignore SSM codes. From this information, it is then determined whether the system is capable of using SSM, as shown in step 1103.

One manner in which one may determine whether the network element is using SSM (so as to assist in preventing timing loops from occurring within the network) is to examine the value of the RX SSM Quality Code Override value 901. If this value, 901, is any value other than "STU", then it will be determined that the network is fully utilizing all the SSM functionalities. Therefore, the value of "AUTO" shown in FIG. 9 would indicate that SSM is being fully utilized in the network being examined. If any one network element is provisioned to ignore SSM, the system should be considered as not fully utilizing SSM and assessed appropriately for possible timing loops.

If it has been determined that all network elements are fully utilizing SSM, then timing loop occurrence has been greatly reduced, even if the timing distribution engineering promotes the occurrence of a timing loop in the network. However, the present invention permits the examination of the timing distribution engineering in such a case as well, in order to verify the integrity of the system and to report whether or not timing loops are still possible in the circumstances similar to that mentioned above.

To accomplish this, for each network element in the network, it is determined whether the NE timing provisioning rules have been violated. The risk of a timing loop occurring due to the timing distribution engineering (provisioning rules) of the network is evaluated with different criteria depending on whether SSM is fully utilized or whether the network is provisioned such that SSM is to be ignored. In some rare circumstances, timing loops are possible in an improperly provisioned network even when SSM is utilized.

Step 1104 indicates a verification of whether the timing provisioning rules for SSM have been violated. There are many manners in which to determine whether SSM NE timing provisioning rules have been violated. As an example, if a system does not have an external BITS source at every node or at every other node, a timing loop may occur if the system is not provisioned properly. To prevent possible timing loops in such SSM systems, nodes utilizing BITS sources should only be provisioned to seek timing from these sources. Line timing should not be provisioned as a timing option for these sites. These circumstances, in addition to many other similar circumstances, may be investigated in step 1104 to determine whether or not SSM provisioning rules have been violated.

Step 1105 indicates a verification of whether the timing provisioning rules for non-SSM have been violated. Once again, there are many manners in which to determine whether non-SSM NE timing provisioning rules have been violated. As an example, for such non-SSM systems, one rule is that timing references should never be provisioned in a manner in which two adjacent nodes could potentially line time off each other at the same time. Consequently, nodes should be provisioned to only seek timing, directly or indirectly, from a BITS clock. There could be one or multiple BITS clocks in a system. Although many other rules and statuses may be verified, this is a basic requirement that may be investigated in step 1105.

Following the determination of whether timing provisioning rules have been violated, it is concluded whether the network timing distribution was engineered properly to prevent timing loops (step 1106) or whether the network timing distribution engineering could result in a timing loop (step 1107). In either case, the determination regarding timing loops is made following these steps, resulting in an end to the process (step 1108).

Figure 12A:
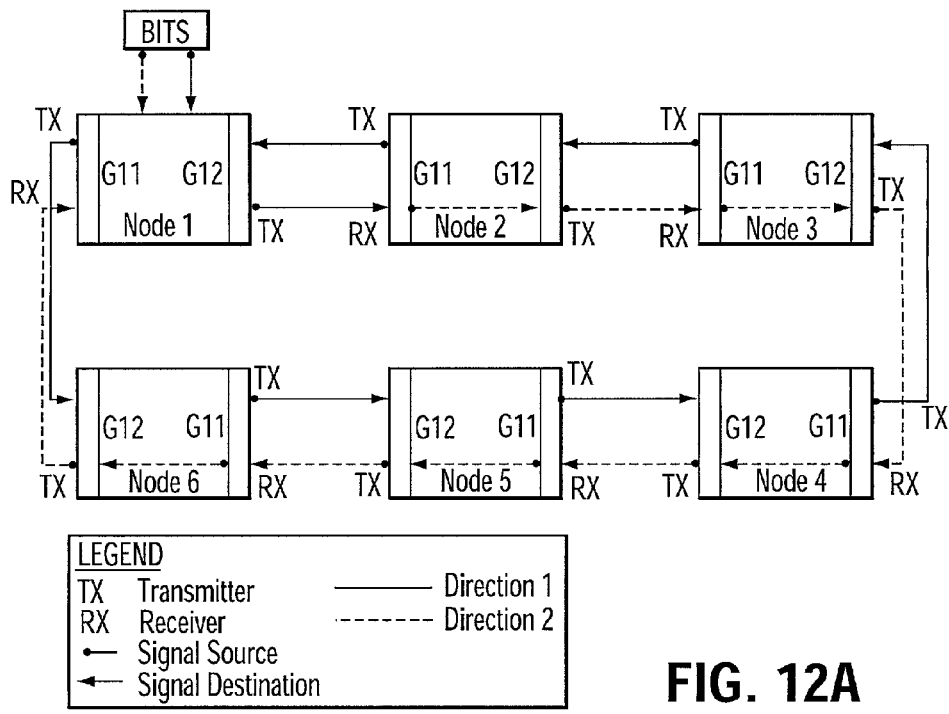
FIG. 12A illustrates a 6-node 2-fiber bi-directional ring without SSM capabilities in a steady state.

As an illustrative example, consider the network illustrated in FIG. 12A. This figure shows a 6 node 2-fiber bi-directional ring without SSM capabilities in a stable or steady state. In this example, the timing references have been set to accept timing from G12 to G11 in Direction 2, and G11 to G12 in Direction 1 for each network element. The timing used for the network elements are in Direction 2.

Figure 12B:
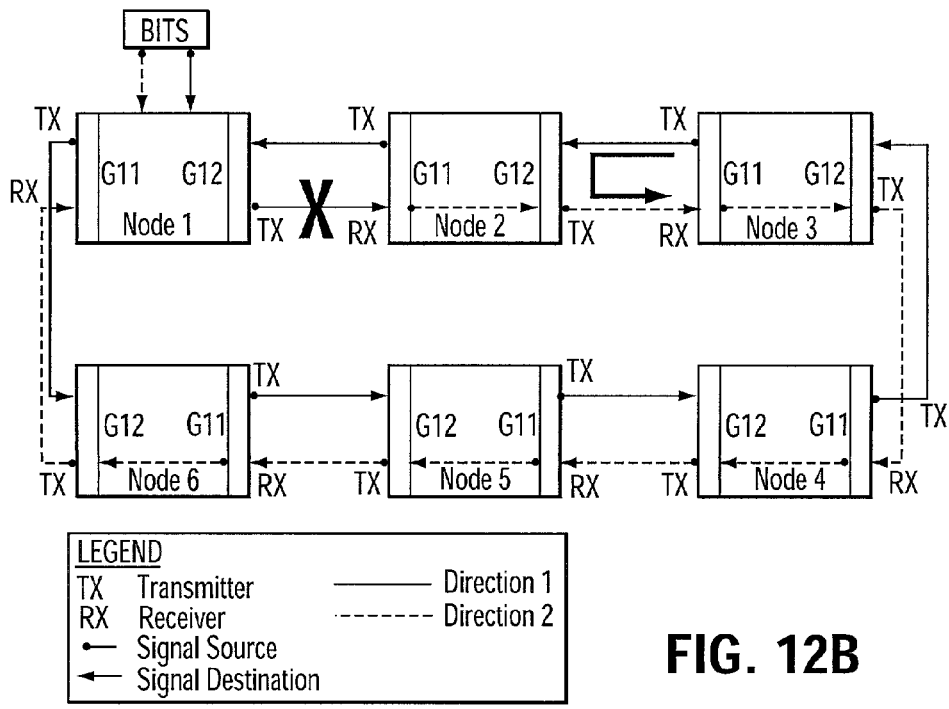
FIG. 12B illustrates an example of the timing distribution reaction of the network of FIG. 11A upon the loss of Node 2's timing source from Node 1.

FIG. 12B illustrates an example of the network's timing distribution reaction upon the loss of Node 2's timing source from Node 1. When Node 2 loses its first timing source located at G11, Node 2 automatically switches to its other possible timing source. Since Node 2 has had another timing source provisioned by the customer, G12, Node 2 now uses the timing it receives on G12 in Direction 1.

However, the timing source used by Node 3 is the signal it receives on G11, which was transmitted by Node 2. At this point, Node 2 and Node 3 are in a timing loop. Since timing reference sourcing is in a non-revertive function, the timing for Node 2 is unable to be restored so as to use the signal received on G11; consequently, timing degradation between Nodes 2 and 3 continues, since the loop remains intact. Manual intervention is required to stop the loop, and return Node 2's timing source back to using G11. The violation of provisioning rules in a non-SSM system as in FIG. 12A could also have been encountered if Node 1 were provisioned to accept BITS timing, but was also provisioned to accept timing from G11 and G12.

The scenario shown in FIGS. 12A and 12B has only one BITS clock. As such, this BITS clock is obviously the clocking source for the ring. However, this is only an illustrative example in order to simplify the explanation of such a scenario. In reality, it is possible and probable for other NEs to have BITS clocks as well. For example, nodes 4, 5 and 6 could all have BITS clocks but nodes 2 and 3 could still have a timing loop under the right scenario or provisioning mistake.

The examples in FIGS. 12A and 12B discussed above describe a situation where non-SSM NE timing provisioning rules are violated. This constitutes passing through step 1105 and then to step 1107 in FIG. 11. Examples will now be presented for the other three situations that are possible in the flowchart of FIG. 11.

For a non-SSM system such as in FIG. 12A, the nodes could be provisioned as in any one of the following situations and would not violate any rules:

Node 1 receives timing from BITS A and BITS B;
Nodes 2 and 3 receive timing from G11;
Node 4 receives timing from G11 and/or G12; or
Nodes 5 and 6 receive timing from G12.

Provisioning situations as listed above would result in passing through step 1105 to step 1106 in FIG. 11.

The following two examples regard situations in which it has been determined that the network element is using SSM.

A situation where SSM NE timing provisioning rules are violated may occur if the system has 1 BITS clock and is provisioned (optioned) to accept timing from BITS timing as well as from line timing (G11 and/or G12). It is also worthy to note that if all the nodes in FIG. 12A had BITS timing sources provisioned, they could also be provisioned to accept line timed sources. They would only be in danger of a timing loop if multiple BITS sources failed simultaneously. Since it is usually the case that such sites are not in the same location and using different external BITS sources, it is highly unlikely that this simultaneous multiple BITS source failure would occur. However, in some cases it is actually possible for a customer to have two nodes at the same location. In this case, the nodes would be running off the same BITS clock and could have a problem if the BITS clock fails. In many cases, there still needs to be an element of user interaction and judgment with the tool. Obviously there are many other examples that are possible which would fall under this category, namely that of SSM NE timing provisioning rules being violated, which constitutes proceeding through step 1104 to step 1107 in FIG. 11.

Finally, situations wherein SSM NE timing provisioning rules are not violated will be described. Any of the three following scenarios will result in non-violation of SSM NE timing provisioning rules:

All Nodes have an externally timed BITS clocks at their location. This scenario could be confusing in that it may be possible for a line timed signal such as G11 to be taken out of a shelf and be re-inserted as a BITS clock;

Every other node (i.e. Node 1, Node 3, Node 5 . . . ) has externally timed BITS clocks; or All Nodes with externally timed BITS sources are not provisioned (optioned) to accept line timing (G11 or G12).

Provisioning situations as listed above would result in passing through step 1104 to step 1106 in FIG. 11.

What is claimed is:

1. A method of detecting the potential of a timing loop occurrence within an optical network having a plurality of network elements (NE) comprising the steps of:
    determining possible clock sources for each network element;
    checking a status of synchronization status messaging (SSM) for each of said network elements; and
    determining, on the basis of said clock source determination and said SSM status check, that the timing distribution of said network is engineered to create a timing loop if timing provisioning rules are violated at any of said network elements.

2. A method according to claim 1 wherein said step of determining that the timing distribution of said network is engineered to create a timing loop utilizes a first set of rules for SSM NE timing provisioning and a second set of rules for SSM NE timing provisioning.

3. A method according to claim 2 wherein said first set of rules comprises verifying whether nodes utilizing building integrated timing supplies (BITS) sources are provisioned to seek timing from only said BITS sources and not provisioned to accept line timing, whereby a negative response constitutes a positive determination of a non-SSM NE timing provisioning rule violation.

4. A method according to claim 2 wherein said second set of rules comprises verifying whether timing references are provisioned in a manner in which two adjacent nodes could potentially line time off each other at the same time, whereby an affirmative response constitutes a positive determination of non-SSM NE timing provisioning rule violation.

5. A method according to claim 1 wherein said step of checking a status of synchronization status messaging for each of said network elements comprises:
    issuing a network command for retrieving an RX SSM Quality Override value;
    verifying whether said value resulting from said network command is a value other than STU,
    whereby if said value is any value other than STU, the network element is determined to be fully utilizing SSM.

6. An apparatus for detecting the potential of a timing loop occurrence within an optical network having a plurality of network elements comprising:

means for determining possible clock sources for each network element;

means for checking a status of synchronization status messaging (SSM) for each of said network elements; and means for determining, on the basis of said clock source determination and said SSM status check, that the timing distribution of said network is engineered to create a timing loop if timing provisioning rules are violated at any of said network elements.

7. An apparatus according to claim 6 wherein said means for determining that the timing distribution of said network is engineered to create a timing loop comprises:

means for verifying whether a first set of rules for SSM NE timing provisioning has been violated; and means for verfying whether a second set of rules for non-SSM NE timing provisioning has been violated.

8. A method of detecting the potential of a timing loop occurrence within an optical network having a plurality of network elements (NE) comprising the steps of:

building a data block for each of said network elements, each said data block including information regarding the status of synchronization status messaging (SSM) in said network; and determining the potential of a timing loop occurrence in the network based on some of said information in said data blocks.

9. A method according to claim 8 wherein said step of determining the potential of a timing loop occurrence in the network comprises:

determining possible clock sources for each network element;

checking the status of SSM for each of said network elements; and determining, on the basis of said clock source determination and said SSM status check, that the timing distribution of said network is engineered to create a timing loop if the timing provisioning rules are violated at any of said network elements.

10. A method according to claim 9 wherein said step of determining that the timing distribution of said network is engineered to create a timing loop utilizes a first set of rules for SSM NE timing provisioning and a second set of rules for non-SSM NE timing provisioning.

11. A method according to claim 10 wherein said first set of rules comprises verifying whether nodes utilizing Building Integrated Timing Supplies (BITS) sources are provisioned to seek timing from only said BITS sources and not provisioned to accept line timing, whereby a negative response constitutes a positive determination of non-SSM NE timing provisioning rule violation.

12. A method according to claim 10 wherein said second set of rules comprises verifying whether timing references are provisioned in a manner in which two adjacent nodes could potentially line time off each other at the same time, whereby an affirmative response constitutes a positive determination of non-SSM NE timing provisioning rule violation.

13. A method according to claim 8 further comprising, before said step of building a data block for each of said network elements, the steps of:

determining a topology of said network; and extracting data from said network elements.

14. A method according to claim 9 wherein said step of checking a status of synchronization status messaging for each of said network elements comprises:

issuing a network command for retrieving an RX SSM Quality Override value;

verifying whether said value resulting from said network command is a value other than STU, whereby if said value is any value other than STU, the network element is determined to be fully utilizing SSM.

15. A method according to claim 8 wherein said step of building a data block for each of said network elements comprises:

issuing a network command for retrieving network element information selected from the group comprising: equipment information, timing information, and facility, payload and optical information;

gathering said equipment information; and extracting values from said equipment information for use in said data block.

16. An apparatus for detecting the potential of a timing loop occurrence within an optical network having a plurality of network elements comprising:

means for building a data block for each of said network elements, each said data block including information regarding the status of synchronization status messaging (SSM) in said network; and means for evaluating timing distribution engineering of said network based on some of said information in said data blocks, so as to determine the potential of timing loop occurrence in the network.

17. An apparatus according to claim 16 wherein said means for evaluating timing distribution engineering of said network comprises:

means for checking a status of SSM for each of said network elements;

means for determining possible clock sources for each of said network elements; and means for determining, on the basis of said clock source determination and said SSM status check, that the timing distribution of said network is engineered to create a timing loop if timing provisioning rules are violated at any of said network elements.

18. An apparatus according to claim 16 further comprising:

means for determining a topology of said network; and means for extracting data from said network elements.

19. An apparatus according to claim 16 wherein said means for building a data block for each of said network elements comprises:

means for issuing a network command for retrieving network element information, said network command selected from the group comprising: equipment information, timing information, and facility, payload and optical information;

means for gathering said network element information; and means for extracting values from said network element information for use in said data block.

20. A program storage medium readable by a computer having a memory, the medium tangibly embodying one or more instructions executable by the computer to perform method steps according to claim 1 for detecting the potential of a timing loop occurrence.

21. A program storage medium readable by a computer having a memory, the medium tangibly embodying one or more instructions executable by the computer to perform method steps according to claim 8 for detecting the potential of a timing loop occurrence.

* * * * *